US009458961B2

(12) United States Patent
Talbot

(10) Patent No.: US 9,458,961 B2
(45) Date of Patent: Oct. 4, 2016

(54) EQUIPOISE ARMATURE

(71) Applicant: Eric Talbot, Salem, OR (US)

(72) Inventor: Eric Talbot, Salem, OR (US)

(*) Notice: Subject to any disclaimer, the term of this patent is extended or adjusted under 35 U.S.C. 154(b) by 0 days.

(21) Appl. No.: 14/301,090

(22) Filed: Jun. 10, 2014

(65) Prior Publication Data

US 2015/0354749 A1 Dec. 10, 2015

(51) Int. Cl.
*G02B 27/00* (2006.01)
*G02B 3/00* (2006.01)
*F16M 11/20* (2006.01)
*G02B 7/00* (2006.01)
*G02B 25/00* (2006.01)
*F21V 21/28* (2006.01)
*F21S 6/00* (2006.01)

(52) U.S. Cl.
CPC ...... *F16M 11/2042* (2013.01); *F16M 11/2085* (2013.01); *F16M 11/2092* (2013.01); *G02B 7/001* (2013.01); *G02B 25/005* (2013.01); *F21S 6/003* (2013.01); *F21V 21/28* (2013.01)

(58) Field of Classification Search
CPC ......... F16M 11/2042; F16M 11/2092; F16M 11/2085; G02B 7/001; G02B 25/005; F21S 6/003; F21V 21/28
USPC .................. 359/809, 811, 817, 872
See application file for complete search history.

(56) References Cited

U.S. PATENT DOCUMENTS

| 1,255,185 | A | 2/1918 | Lehmkuhl |
| 3,219,303 | A | 11/1965 | Stryker |
| 3,311,340 | A | 3/1967 | Riis |
| 3,883,105 | A | 5/1975 | Matsumoto |
| 4,892,278 | A * | 1/1990 | Huang .......... F21V 21/26 248/124.1 |
| 5,150,866 | A | 9/1992 | Karpisek |
| 5,484,127 | A | 1/1996 | Mower et al. |
| 6,896,230 | B2 | 5/2005 | Cvek |
| 6,991,199 | B2 | 1/2006 | Carpentier |
| 7,158,292 | B2 | 1/2007 | Metelski |
| 7,971,840 | B2 | 7/2011 | Hirschhorn |
| 8,006,850 | B2 | 8/2011 | Rotheisler |
| 8,066,251 | B2 | 11/2011 | Brown |
| 8,142,083 | B2 | 3/2012 | Brown |
| 2003/0075658 | A1 | 4/2003 | Beissel, Jr. et al. |
| 2004/0124328 | A1 | 7/2004 | Cvek |
| 2007/0001076 | A1 | 1/2007 | Asamarai et al. |
| 2011/0248138 | A1 | 10/2011 | Chan |

* cited by examiner

*Primary Examiner* — Alicia M Harrington
(74) *Attorney, Agent, or Firm* — patenttm.us

(57) ABSTRACT

An equipoise armature comprises a parallelogram with a bridge piece positioned at a centroid based on the weight of a supported article and counterweight, to enable pivotal mounting of the armature to the bridge piece. The armature is adapted to carry an article, such as a lamp, a magnifier, a display, etc., for positional movement of the article.

8 Claims, 9 Drawing Sheets

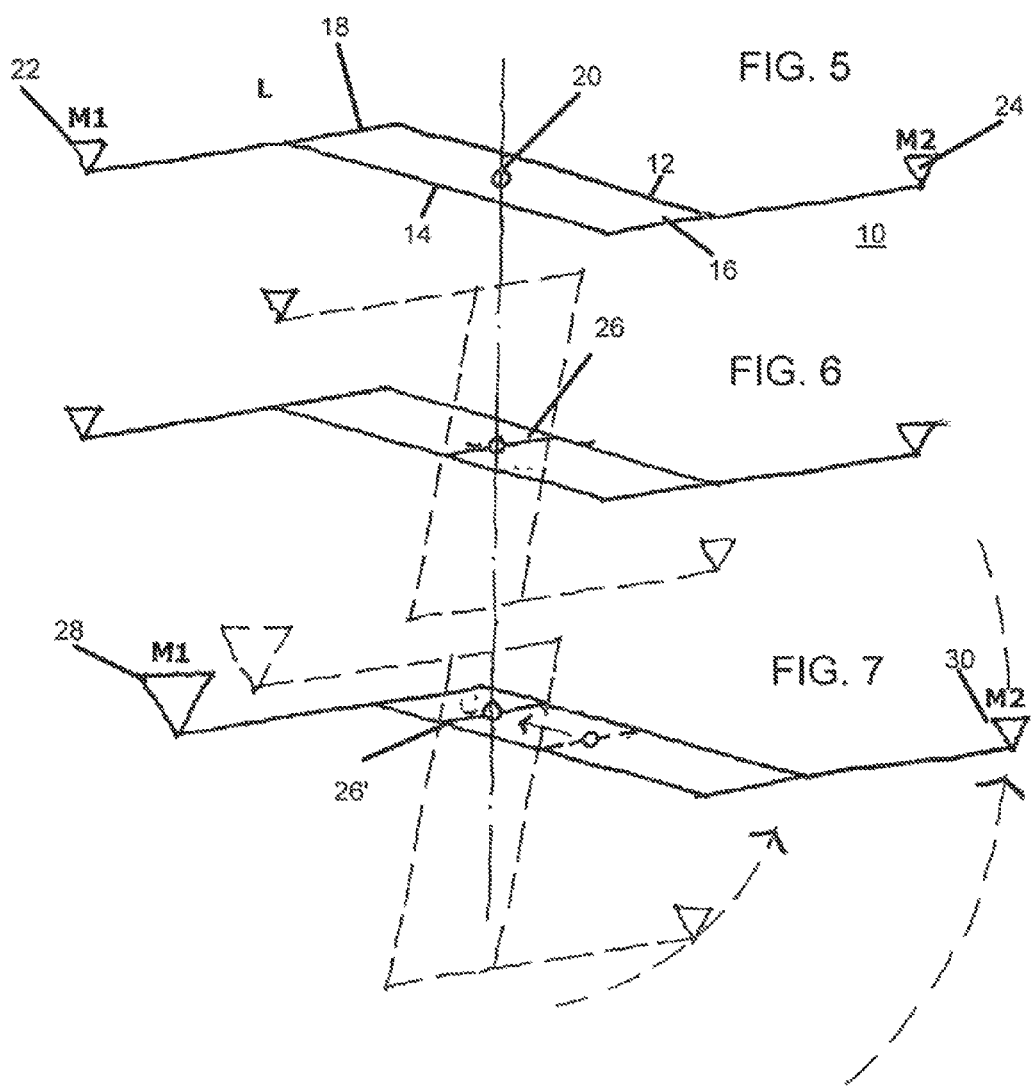

PROPOSED DEVICE BALANCE DIAGRAM

EQUIPOISE ARMATURE

BACKGROUND

This disclosure relates to armatures, and more particularly to an equipoise armature suitable for many uses.

FIG. 1 illustrates a simple balance beam or lever having symmetrical loading of substantially equal weights at each end of the lever, and the fulcrum at the center position of the beam. If the loading at the ends is different, the fulcrum point is moved to keep the beam in balance, as shown in FIG. 2.

If using these concepts for supporting an item, such as a lamp, it is advantageous to employ a "Z" beam, where a pivot is added mid-portion of the beam at either side of the fulcrum, to allow extension/contraction positioning of the ends of beam(s), as illustrated in FIG. 3, with equal loading at the ends, or FIG. 4, with unequal loading.

FIG. 12 is a schematic representation of the device disclosed in U.S. Pat. No. 3,219,303, which 1) is a "pantograph" configuration (with two perpendicular sides extending into arms, and 2) has its balance point on the parallelogram, as opposed to an interior point "C". With the balance point on the edge corner of the parallelogram, it creates an imbalance when the device out of level. In level position, the balance point "C" is centered over the fulcrum centerline. But, as the device is rotated out of level (down and around) this results in more and more of the device being "all on one side" of the fulcrum centerline: lopsided (see: "A" Device Rotated). The device here will continue to rotate (B) and invert into an upside down hanging equilibrium. Indeed, the built device based on this patent requires a friction screw at the balance point to provide resistance to this overturning tendency. Extending perpendicular parallelogram sides for arms, instead of opposing sides, further exacerbates this lopsidedness.

FIGS. 14 and 15 are diagrams based on the disclosure of U.S. Pat. No. 6,991,199, which is based on a "bent parallelogram" with what looks to be a bridge segment subdividing the parallelogram. On inspection it is observed that the bridge segment "A" is fixed on the table base, and is not free to rotate. Nor is it weight counterbalanced, but spring balanced. FIG. 14 shows the device in a stowed position and FIG. 15 adds the configuration in the extended position. This device is a two position device (stowed, extended), instead of an infinite position device. Its lower portions are bent to create a mechanical advantage for its two positions. These limitations (fixed bridge element; two position limit; and spring counterbalance) are part of what makes this device less desirable.

Whereas the U.S. Pat. No. 6,991,199 patent document represents the "bent parallelogram" as elemental, we observe that one of the corners of the parallelogram below the bridge can be removed and not affect the levering of the parallelogram by the lever arm below the bridge element "A": the remaining arm with spring counterbalance connection will still lever the device from stowed to extended. What looks to be an important integral part of the parallelogram is, in fact, redundant. This redundancy is part of what makes this device less desirable.

What would be desirable would be to have an armature that allows an object, such as a lamp, magnifier, display, or the like to be re-positionably supported in an efficient manner, remaining balanced whether at a horizontal angle, a vertical angle, in an open position, or in a closed position.

SUMMARY

In accordance with the disclosure, an armature is constructed as a lever beam comprised of a parallelogram with opposing extensions of two of its opposite sides, and a bridge-piece mid parallelogram to provide a physical location (at the device centroid) for a lever pivot point.

Accordingly, it is an advantage of the present disclosure to provide an improved armature.

It is a further advantage of the present disclosure to provide an improved armature for supporting objects.

It is yet another advantage of the present disclosure to provide an improved support arm for carrying a lamp, a display, a microphone, a screen, or other uses The subject matter of the present technology is particularly pointed out and distinctly claimed in the concluding portion of this specification. However, both the organization and method of operation, together with further advantages and embodiments thereof, may best be understood by reference to the following description taken in connection with accompanying drawings wherein like reference characters refer to like elements.

BRIEF DESCRIPTION OF THE DRAWINGS

FIG. 5 is a schematic diagram of an equipoise armature with imaginary theoretical center indicated;

FIG. 6 is a schematic diagram of an equipoise armature with an added bridge, with equal weights at the ends of the arms;

FIG. 7 is a schematic diagram of an equipoise armature with an added bridge, with unequal weights at the ends of the arms, wherein the bridge position is moved;

DETAILED DESCRIPTION

The system according to a preferred embodiment of the present disclosure comprises an armature that employs a parallelogram lever beam having opposing extensions of two of its opposite sides. A bridge-piece connects two of the parallel legs at the centroid of the configuration (when considering the relative weights of the objects carried at the ends of the extension) to provide a pivot point. In use, the system is in equilibrium, regardless of the rotation position about the pivot point.

Figures 1, 2, 3, 4:
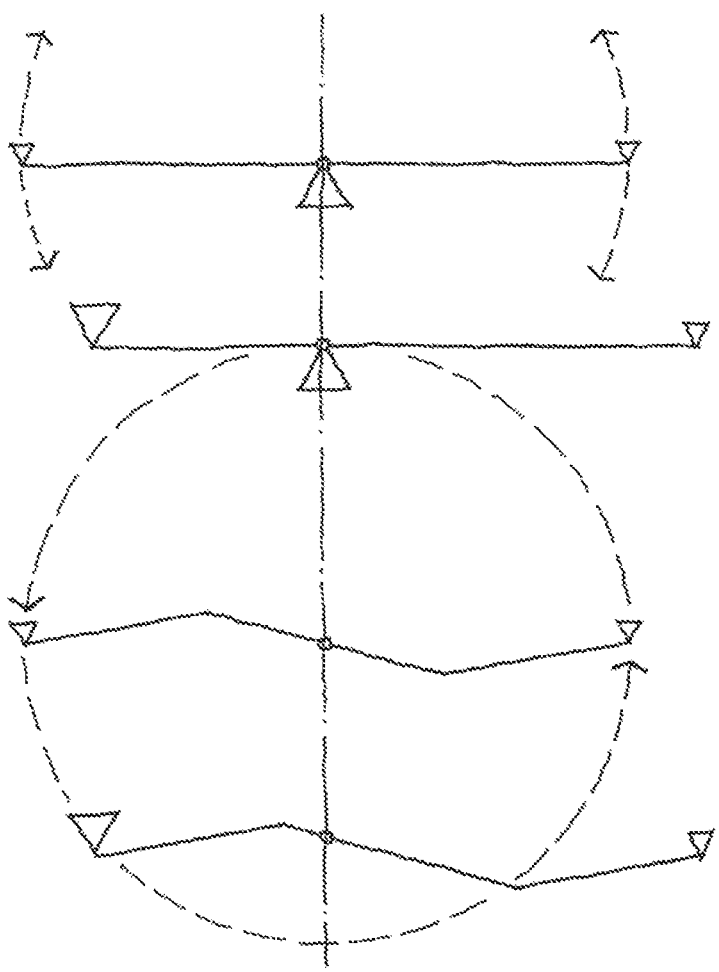
FIG. 1 is a diagram of a simple balance beam/lever with symmetrical loading.
FIG. 2 is a diagram of a simple balance beam/lever with asymmetrical loading.
FIG. 3 is a diagram of a "Z" beam/lever with symmetrical loading.
FIG. 4 is a diagram of a "Z" beam/lever with asymmetrical loading.

Referring now to FIG. 5, the armature 10 is constructed as a "Z" Beam parallelogram (parallel sides 12, 14 and 16, 18 with extensions provided to extend sides 16 and 18 outwardly. A pivot point 20 is provided at the beam centroid (the center of mass of the beam. In FIG. 1, a force 22 is illustrated at the left end of arm 18, balanced by force 24 at the right end of arm 16.

Considering FIG. 6, a schematic diagram of an equipoise armature with an added bridge with equal weights 22', 24' at each end, a bridge segment 26 is pivotally connects sides 12, 14, to provide the connection point (suitably at the center of the bridge segment) to the pivot. The dashed lines in FIG. 1 illustrate the movement action of the equipoise armature when the ends of arms 16, 18 are moved closer together (whereas the solid lines show the configuration when the arm ends are moved farther apart).

FIG. 7, a further schematic diagram of an equipoise armature with an added bridge, illustrates the case of with unequal weights 28, 30 at the ends of the arms, wherein the bridge position is moved towards the left in FIG. 7 (towards the direction of the weight 28, 30 that is greater in weight). The dashed lines illustrate the movement of the armature when the ends of arms 16, 18 are brought closer together. Movement of the bridge allows compensation for the weight differential between the two end weights.

Figure 8:
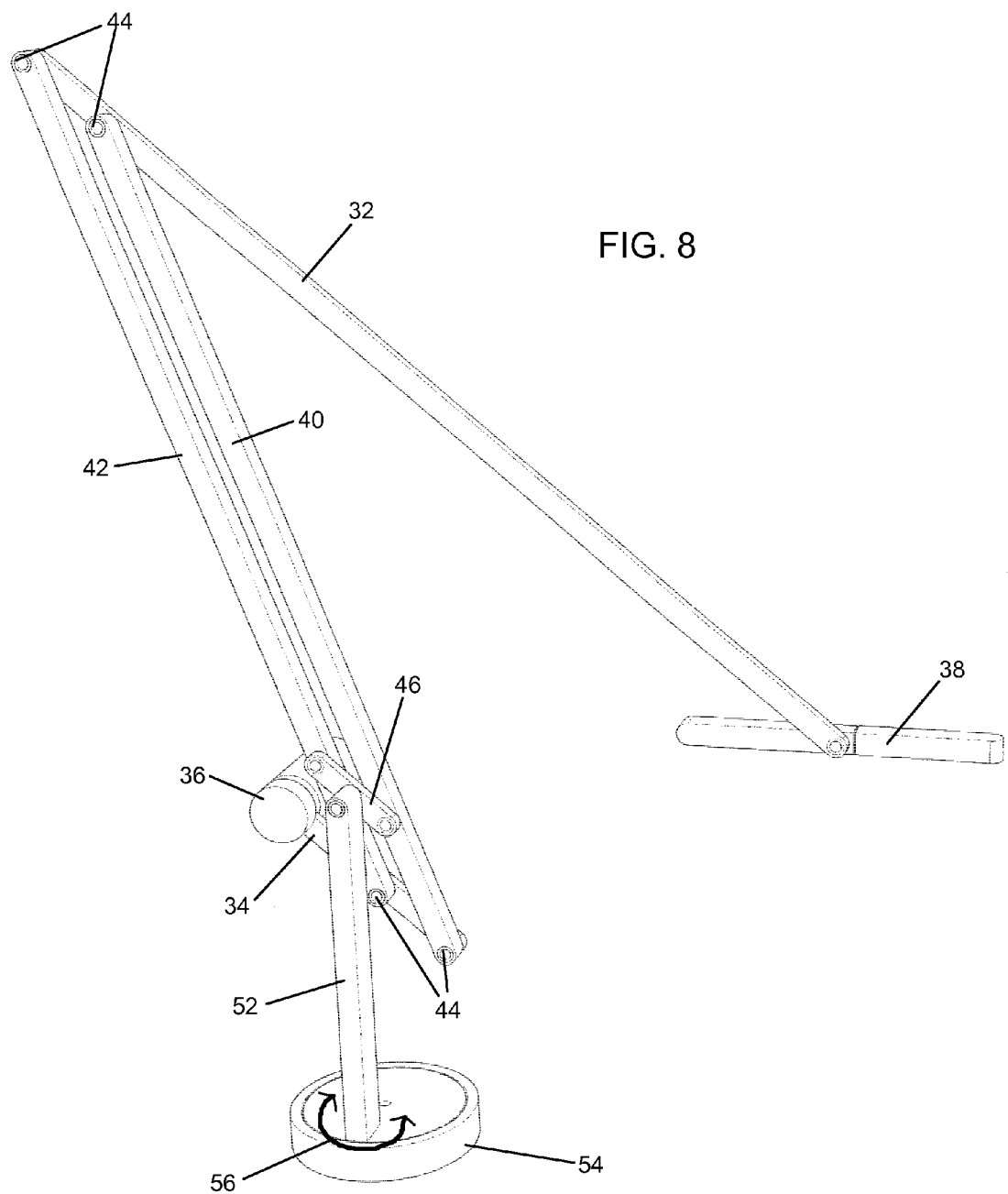
FIGS. 8-10 are illustrations of the equipoise armature used as a lamp armature.
Figure 9:
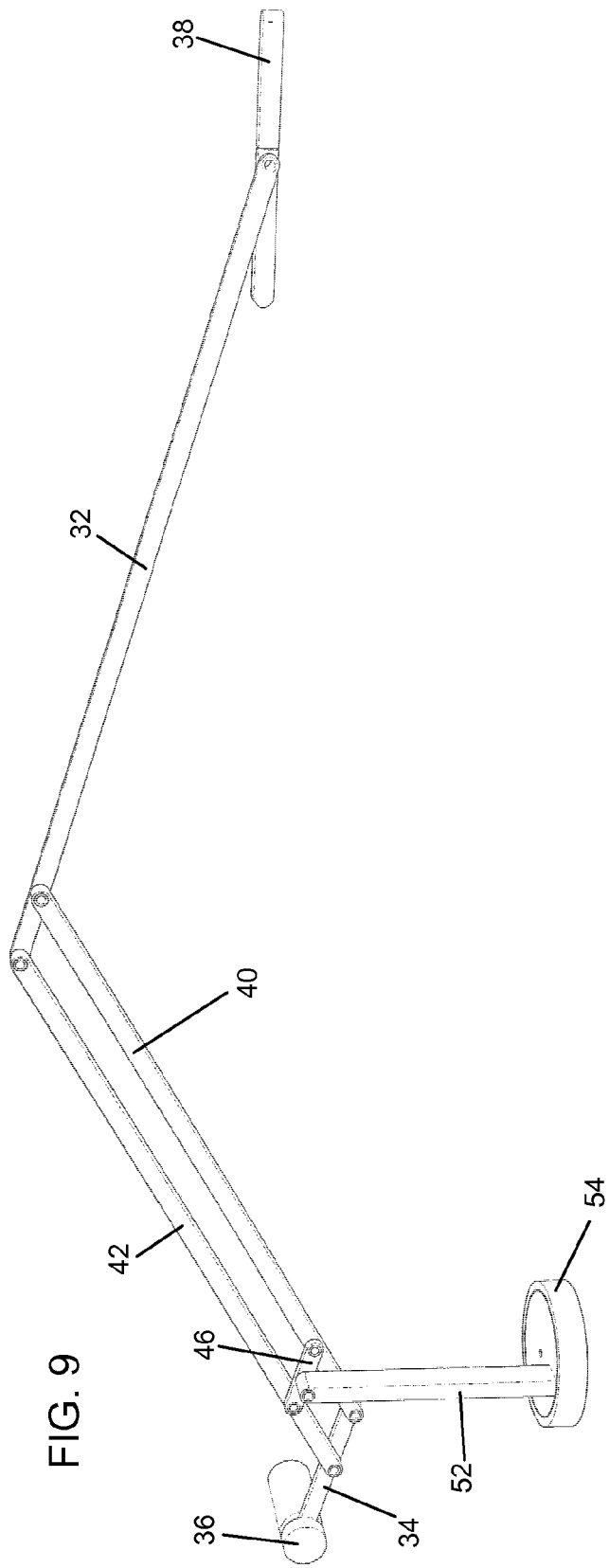
Figure 10:
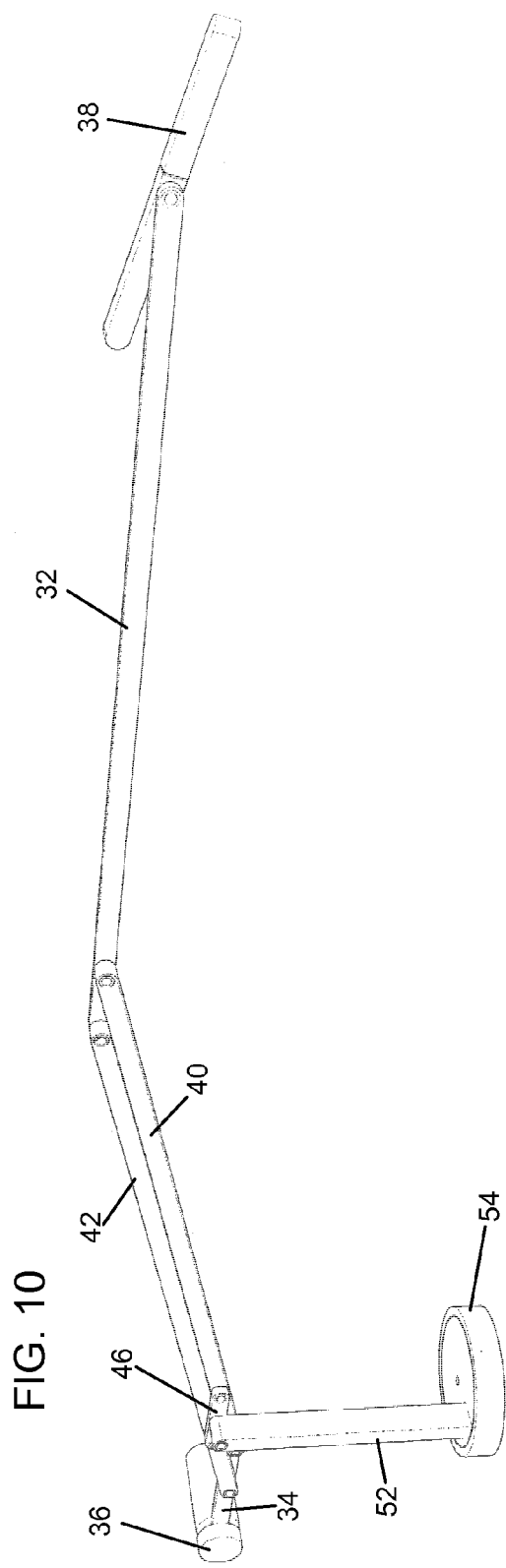

FIGS. 8-10 are perspective view illustrations of the equipoise armature used as a lamp armature, wherein in FIG. 8, the armature is retracted to substantially the position of greatest retraction. In FIG. 9, the armature is extended a substantial amount, while in FIG. 10, the armature is drawn-out to its maximum extent.

In the lamp armature configuration shown, the extension arms 32, 34 (corresponding to arms 18, 16 of FIG. 5) are of unequal length and a counter weight 36 is positioned at the outer end of shorter arm 34, to counter balance the weight of lamp 38, positioned at the far end of arm 32. Central arms 40, 42 are substantially the same length in this configuration. Arms 40 and 40 are pivotally connected to arms 32, 34 in spaced arrangement, via pivot members 44.

Bridge 46 is connected at pivot points 48, 50 to each of central arms 40, 42, and a mounting stand arm 52 is connected generally centrally of the bridge to allow pivoting of the entire assembly. The mounting stand arm is suitably rotationally mounted to base 54 to allow rotation of the lamp assembly as illustrated by arc 56, whether by rotation of arm 52 relative to the base 54 or rotation of the base 54 relative to the surface on which the base sits. In operation, the longitudinal axis of the bridge remains parallel to the longitudinal axes of the extension arms.

Figure 11:
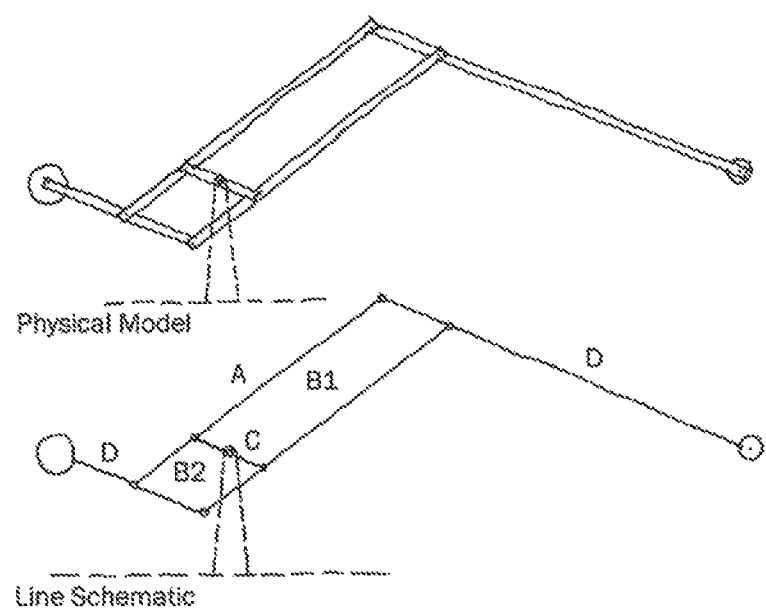
FIG. 11 is a physical model and a line schematic view of the device of the present disclosure.

In summary, referring to FIG. 11, a view of a physical model and line schematic of the configuration of a device in accordance with the present disclosure, the device has main parallelogram "A" inscribed with two smaller parallelograms B1 and B2. This subdivision is result of addition of bridge-piece "C" which provides a center point "inside" the main parallelogram for balance on fulcrum. In addition, the main parallelogram extends two opposing sides, in opposition, into arms "D": the whole forming a spiral. This spiral is what keeps the ends of the arms always the same relative each other across the balance point. The present device remains balanced at horizontal angle, vertical angle, open, or closed, providing an improvement over the art.

Figure 12:
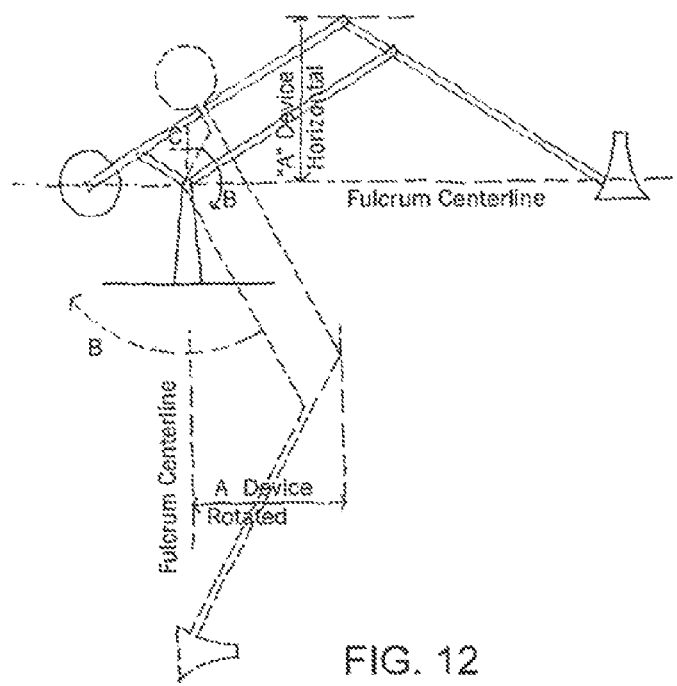
FIG. 12 is a view of a device in accordance with U.S. Pat. No. 3,219,303.

Referring to FIG. 12, a view of a device in accordance with U.S. Pat. No. 3,219,303, the device therein 1) is a "pantograph" configuration (with two perpendicular sides extending into arms), and 2) has its balance point on the parallelogram. With the balance point on the edge corner of the parallelogram, it creates an imbalance when the device is out of level. In level position, the balance point "C" is centered over the fulcrum centerline. But, as the device is rotated out of level (down and around) this results in more and more of the device being "all on one side" of the fulcrum centerline: lopsided (see: "A" Device Rotated). The device of this patent will continue to rotate (B) and invert into an upside down hanging equilibrium. Indeed, the built device based on this patent requires a friction screw at the balance point to provide resistance to this overturning tendency. Extending perpendicular parallelogram sides for arms, further exacerbates this lopsidedness.

Figure 13:
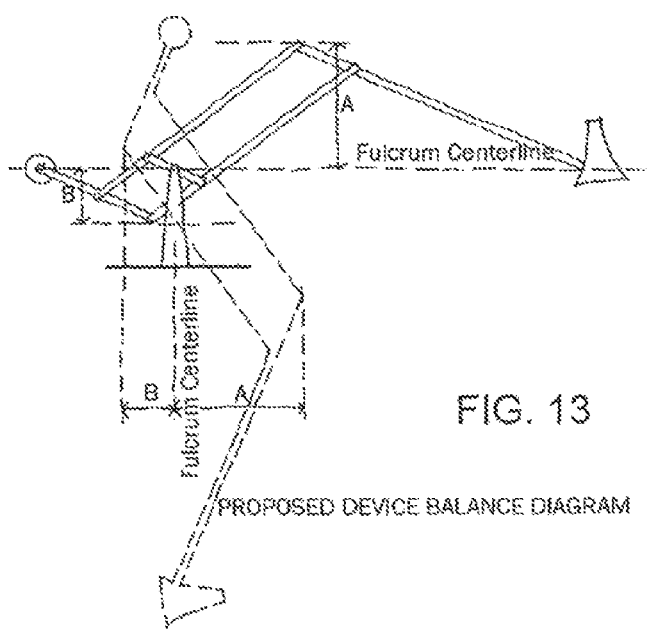
FIG. 13 is an illustration of the presently disclosed device as a lamp support.

Unlike the device of U.S. Pat. No. 3,219,303, which has extending perpendicular parallelogram sides for arms which exacerbate the lopsidedness of the device therein, the presently disclosed device has two opposing sides. Referring to FIG. 13, an illustration of the presently disclosed device, the present device always has equal parts (distances A and B) of its assembly on either side of the fulcrum centerline. Thus is superior as it has none of the overturning tendency of the device of U.S. Pat. No. 3,219,303.

Figure 14:
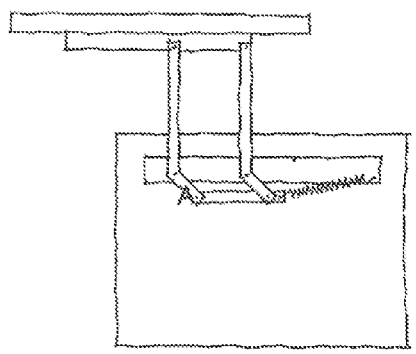
FIG. 14 is a view of the device of U.S. Pat. No. 6,991,199 in a stowed position.
Figure 15:
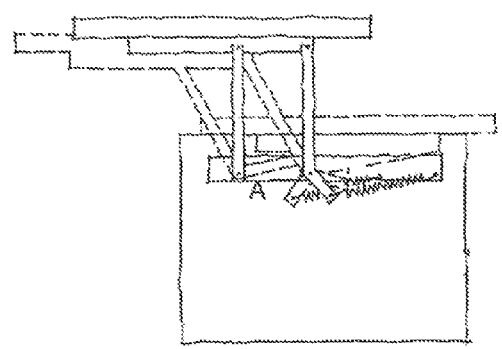
FIG. 15 is a view of the device of U.S. Pat. No. 6,991,199 in an extended position.
Figure 16:
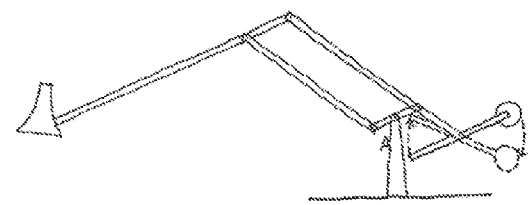
FIG. 16 is a hypothetical illustration of a configuration of the present disclosure altered to match that of the U.S. Pat. No. 6,991,199 device.

Further, with reference to the U.S. Pat. No. 6,991,199 device, shown in FIG. 14 in a stowed position, and FIG. 15 in an extended position which shows the armature moving from a stowed to open position with spring length change, to make the configuration of the present disclosure match that of the U.S. Pat. No. 6,991,199 device, removing the same segment (A) of FIG. 15 from device of the current disclosure (see FIG. 16) results in the counterbalancing arm to flop away of its own accord, now having no connection, or influence, to the assembly's main parallelogram, rendering the device unworkable. Unlike the "Bent Parallelogram", the device of the current disclosure has a non-subtractive assembly, each of its elements contributing to its more sophisticated, and superior, performance.

Figures 17, 18:
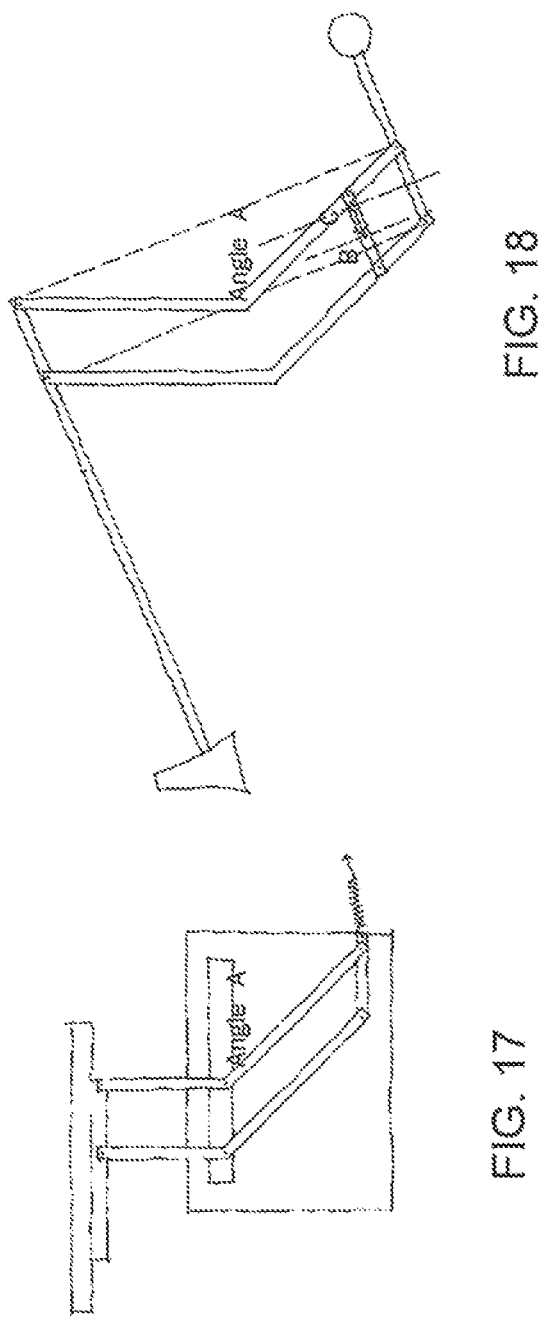
FIGS. 17 and 18 are illustrations of extending the "bent parallelogram" device of U.S. Pat. No. 6,991,199 below an "Angle A" to illustrate contrast with the presently disclosed device.

Further considering the present device in contrast to that of U.S. Pat. No. 6,991,199, with reference to FIGS. 17 and 18, FIG. 17 shows the possibility of extending the "bent parallelogram" device of U.S. Pat. No. 6,991,199 below "Angle A", to be comparable in size and length to device of the present disclosure, with counterbalance spring still operable. This is a test illustration, which shows that the possibility that the "bent parallelogram" is not the same as present disclosed device's regular parallelogram.

FIG. 18 shows an attempt to use the "bent parallelogram" of U.S. Pat. No. 6,991,199 on the device of the present disclosure. This test shows that bending the parallelogram moves the device axis "B" away from the true balance center, or centroid, "C". With the device axis moved off-centroid, the device becomes "lopsided", rendering it less effective thus inferior as a result of incorporating the teaching of U.S. Pat. No. 6,991,199.

Therefore, the device in accordance with the present disclosure is seen as different and superior in respect to the prior art devices, including the following features: Spiral not pantograph; Center-balanced not edge-balanced; Subdivided-parallelogram that cannot be subtracted from as it can the one patent, Regular-parallelogram not bent-parallelogram; Balanced at all angles, not top-heavy in some; and Counter-weighted in infinite positions not counter-sprung in two positions.

The present device is markedly identifiable by its 1) main parallelogram subdivided by 2) a bridge-piece, and 3) its spiral armatures.

Accordingly, an equipoise armature is provided suitable for use as a lamp armature, display support, microphone stand, screen positioning device, lift or other uses.

While a preferred embodiment of the technology has been shown and described, it will be apparent to those skilled in the art that many changes and modifications may be made without departing from the broader aspects. The appended claims are therefore intended to cover all such changes and modifications as fall within the true spirit and scope of the technology.

What is claimed is:

1. An equipoise armature, comprising:
    a parallelogram member including first and second central arms and first and second end arms, wherein said first and second central arms and said first and second end arms are respectively pivotally connected at ends thereof;
    a bridge member connecting said first central arm and said second central arm at positions other than ends of said first central arm and said second central arm,
    further comprising a member supported at a first end of said first end arm and a counterweight supported at a first end of said second end arm,
    wherein a second end of said first end arm connects to a first end of said first central arm and wherein a second end of said second end arm connects to a first end of said second central arm, and
    wherein said first end arm connects to a second end of said second central arm at a position away from either end of said first end arm and wherein said second end arm connects to said second end of said first central arm at a position away from either end of said second end arm.

2. A method of providing an equipoise armature, comprising:
    providing a parallelogram member including first and second central arms and first and second end arms, wherein said first and second central arms and said first and second end arms are respectively pivotally connected at ends thereof;
    connecting said first central arm and said second central arm at positions other than ends of said first central arm and said second central arm by use of a bridge member,
    further comprising providing a member supported at a first end of said first end arm and providing a counterweight supported at a first end of said second arm,
    wherein a second end of said first end arm connects to a first end of said first central arm and wherein a second end of said second end arm connects to a first end of said second central arm, and
    wherein said first end arm connects to a second end of said second central arm at a position away from either end of said first end arm and wherein said second end arm connects to said second end of said first central arm at a position away from either end of said second end arm.

3. The method according to claim 2, wherein said bridge member is pivotally connected to said first central arm and said second central arm.

4. The method according to claim 2, further comprising providing a mounting arm carrying said bridge member for mounting said armature to a support.

5. The method according to claim 4, wherein said mounting arm is adapted for rotational movement about a base plane.

6. The method according to claim 2, wherein said positions where said bridge member connects to said first and second central arms is defined based on a centroid of weight of said member and said counterweight.

7. The method according to claim 2, further comprising providing a member for movable support by said armature, said member selected from the group comprising a lamp, a display, and a magnifier.

8. An equipoise armature, comprising:
    a support arm having a first length;
    a counterweight arm having a second length;
    a pair of central arms, said central arms connected pivotally at first ends to said support arm at positions spaced apart a distance along said first support arm, said central arms connected pivotally at second ends to said counterweight arm at positions spaced apart said distance along said counterweight arm; and
    a bridge member arm pivotally connecting said pair of central arms at positions along said central arms away from ends of said central arms,
    wherein, said support arm, said counterweight arm and said bridge member arm are parallel to one another, and said pair of central arms are parallel to one another.

* * * * *